United States Patent
Chang

(10) Patent No.: US 9,462,187 B2
(45) Date of Patent: Oct. 4, 2016

(54) ELECTRONIC DEVICE HAVING BETTER ANTI-SHAKE FUNCTION AND IMAGE ADJUSTMENT METHOD

(71) Applicant: Chiun Mai Communication Systems, Inc., New Taipei (TW)

(72) Inventor: Che-Ping Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 36 days.

(21) Appl. No.: 14/475,149

(22) Filed: Sep. 2, 2014

(65) Prior Publication Data

US 2015/0070518 A1    Mar. 12, 2015

(30) Foreign Application Priority Data

Sep. 9, 2013 (CN) .......................... 2013 1 0405005

(51) Int. Cl.
*H04N 5/208* (2006.01)
*H04N 5/232* (2006.01)
*H04N 5/235* (2006.01)
*H04N 1/409* (2006.01)
*H04N 5/228* (2006.01)

(52) U.S. Cl.
CPC ........ *H04N 5/23267* (2013.01); *H04N 1/4092* (2013.01); *H04N 5/2352* (2013.01); *H04N 5/2353* (2013.01); *H04N 5/23232* (2013.01); *H04N 5/23258* (2013.01); *G06T 2207/20192* (2013.01); *G06T 2207/20212* (2013.01); *H04N 5/23277* (2013.01)

(58) Field of Classification Search
CPC ................... G06T 2207/20192; G06T 5/003; H04N 1/409; H04N 1/4092
USPC ....................... 348/208.2, 208.4, 208.13, 252
See application file for complete search history.

(56) References Cited

U.S. PATENT DOCUMENTS

| | | | | |
|---|---|---|---|---|
| 7,433,025 B2 * | 10/2008 | Greenway | ................ | B01D 9/00 356/30 |
| 8,494,256 B2 * | 7/2013 | Aisaka | .................. | G06T 7/0002 382/156 |
| 8,724,917 B2 * | 5/2014 | Kwon | ..................... | G06K 9/036 348/222.1 |
| 8,724,919 B2 * | 5/2014 | Pillman | ................... | G06T 5/003 382/173 |
| 8,749,646 B2 * | 6/2014 | Mitsunaga | ......... | H04N 5/23248 348/208.6 |
| 8,928,772 B2 * | 1/2015 | Pillman | ................... | G06T 5/004 348/222.1 |
| 2012/0287308 A1 * | 11/2012 | Kojima | ................. | H04N 5/772 348/239 |

* cited by examiner

*Primary Examiner* — Ngoc-Yen Vu
(74) *Attorney, Agent, or Firm* — Zhigang Ma

(57) ABSTRACT

An electronic device includes a camera module and an image module. The camera module captures a number of static images of an object. The image module includes a detecting unit and an image combining unit. The image module detects an edge response value of each image. The image combining unit selects and combines two images having maximum edge response values in turn according to a rate of the edge response values.

8 Claims, 3 Drawing Sheets

ELECTRONIC DEVICE HAVING BETTER ANTI-SHAKE FUNCTION AND IMAGE ADJUSTMENT METHOD

FIELD

The disclosure generally relates to electronic devices, and particularly to an electronic device having a better anti-shake function and an image adjustment method.

BACKGROUND

Electronic devices, such as digital cameras, commonly have an anti-shake function. There are two common anti-shake techniques to reduce image blur caused by shaking. The first technique uses a movable mechanism assembled to a lens or a Charge Coupled Device (CCD) of the electronic device. When shaking occurs at the moment an image is captured, the lens or the CCD is moved slightly, and the movable mechanism reversely moves the lens or the CCD of the electronic device to compensate for the movement of the lens or the CCD.

However, in the first technique, the electronic device must be configured with additional mechanical modules or elements, which is expensive and is unsuitable for miniaturization of the electronic device. The second technique reduces a blur pitch of the captured image using a digital image processing method. However, the second technique requires more processing time.

Therefore, there is room for improvement within the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views. Wherever possible, the same reference numbers are used throughout the drawings to refer to the same or like elements of an embodiment.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
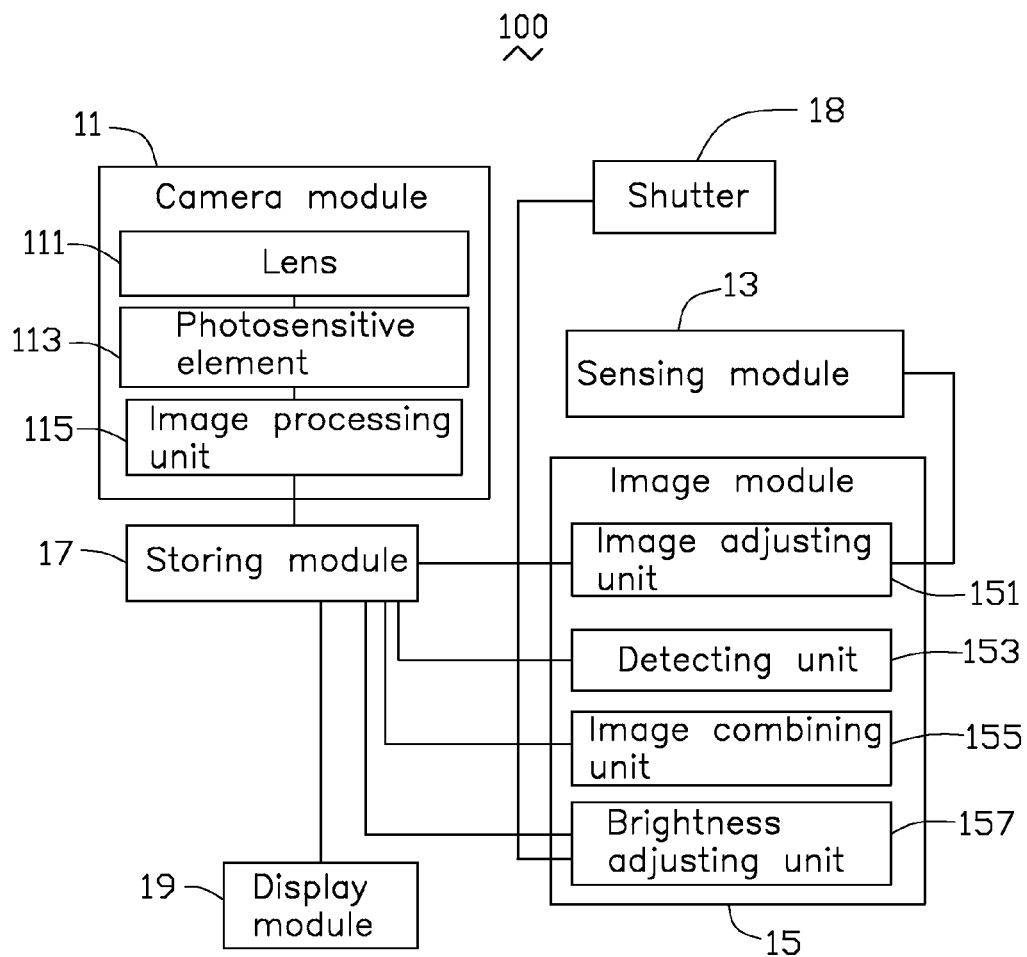
FIG. 1 shows a block diagram of an embodiment of an electronic device.

FIG. 1 shows an embodiment of an electronic device 100. The electronic device 100 can be a digital camera, a mobile phone with a camera module, or the like. The electronic device 100 can include a camera module 11, a sensing module 13, an image module 15, a storing module 17, and a display module 19.

The camera module 11 is configured to capture images. The camera module 11 can include a lens 111, a photosensitive element 113, and an image processing unit 115. The lens 111 is configured to collect light beams from objects. In one embodiment, the photosensitive element 113 can be a Charge Coupled Device (CCD). The photosensitive element 113 is configured to transform the light beams collected by the lens 111 into digital signals. The image processing unit 115 is electronically connected to the photosensitive element 113 and the storing module 17. The image processing unit 115 receives the digital signals from the photosensitive element 113, processes the received digital signals, and transforms the digital signals into corresponding images. The transformed images are stored in the storing module 17.

The sensing module 13 is configured for detecting movement information of the camera module 11 (for example, a shake of the camera module 11). In one embodiment, the sensing module 13 is a gyroscope.

The image module 15 can include an image adjusting unit 151, a detecting unit 153, an image combining unit 155, and a brightness adjusting unit 157. The image adjusting unit 151 is electronically connected to the sensing module 13 and the storing module 17. The image adjusting unit 151 dynamically adjusts each image stored in the storing module 17 according to the movement information detected by the sensing module 13, and transmits the adjusted images to the storing module 17. For example, a plurality of images of an object is captured by the camera module 11 from an original position. When the sensing module 13 detects that the camera module 11 moves a first angle relative to the original position (for example, moves left 0.5 degree relative to the original position), which indicates that an image captured by the camera module 11 also moves left 0.5 degree relative to the original position, the image adjusting unit 151 dynamically adjusts the captured image by moving the captured image in an opposite direction relative to the moving position (for example, moves right 0.5 degree). Thus, the image adjusting unit 151 corrects all the images captured by the image module 11 to the original position, thereby effectively improving a processing speed of the detecting unit 153 and the image combining unit 155.

The detecting unit 153 is electronically connected to the storing module 17. The detecting unit 153 detects an edge response value of each image through an edge detecting technology. The edge response value is represented as a summation of grads of each pixel in one image. In detail, the detecting unit 153 calculates grads of each pixel in one image, and adds the grads of each pixel in one image to obtain the edge response value of each image. The edge response value of each image is also stored in the storing module 17. Generally, if the edge response value of an image is larger, the image is clearer. In one embodiment, the edge detecting technology can be a Sobel edge detecting technology.

The image combining unit 155 is electronically connected to the storing module 17. The image combining unit 155 selects and combines the images of the object adjusted by the image adjusting unit 151 in turn according to the edge response values calculated by the detecting unit 153, thereby obtaining a clear and stable image.

In detail, the image combining unit 155 selects two images having maximal edge response values (that is, the clearest images). The two images having maximal edge response values are also static and captured from a same object. Then, the image combining unit 155 combines the two images having maximal edge response values according to a rate of the two edge response values. In one embodiment, if an edge response value of a first image is a, and an edge response value of a second image is b, then a rate of the first image in the combined image is $$\frac{a}{a+b}*100\%,$$

and a rate of the second image in the combined image is $$\frac{b}{a+b}*100\%.$$

For example, if the edge response value of the first image is 6, and the edge response value of the second image is 4, then the rate of the first image in the combined image is 60%, and the rate of the second image in the combined image is 40%. In detail, the image combining unit 155 multiplies pixel values of the first image by 0.6, multiplies pixel values of the second image by 0.4, and combines the first image and the second image together. Thus, the image combining unit 155 distributes the rates of the two images according to the edge response values, thereby combining the two images into a clear image. After combined, the detecting unit 153 detects an edge response value of the combined image. The combined image and the edge response value of the combined image are also stored in the storing module 17.

The image combining unit 155 continues to select two images having maximal edge response values from the combined images and uncombined images, and combines the two images together according to the above manner until all of the images are combined. After all of the images are combined into one image, the image combining unit 155 transmits the final combined image to the storing module 17.

The display module 19 is electronically connected to the storing module 17. The display module 19 is configured to display the images stored in the storing module 17.

In other embodiments, the electronic device 100 can further include a shutter 18. The shutter 18 is located in front of the lens 111 to prevent the light beams from entering the lens 111. Usually, when a speed of the shutter 18 is faster, an image captured by the image module 11 is clearer, but a brightness of the captured image is lower. When the speed of the shutter 18 is slower, the image captured by the image module 11 is blurrier, but the brightness of the captured image is higher. The brightness adjusting unit 157 is configured to enhance a brightness of the combined image when a speed of the shutter 18 exceeds a predetermined value.

The brightness adjusting unit 157 is electronically connected to the storing module 17 and the shutter 18. The brightness adjusting unit 157 can be a Gamma convertor or a photosensitive adjusting module. The brightness adjusting unit 157 is configured to receive image data of the combined image from the storing module 17, increase a bit of the image data, and transform a Gamma character of the image data to make the character match with Gamma curve 2.2. In this way, a brightness of the combined image is enhanced, and the enhanced image is transmitted to the storing module 17. The brightness adjusting unit 157 also enhances a brightness of the combined image by adjusting an ISO value of the combined image.

Figure 2:
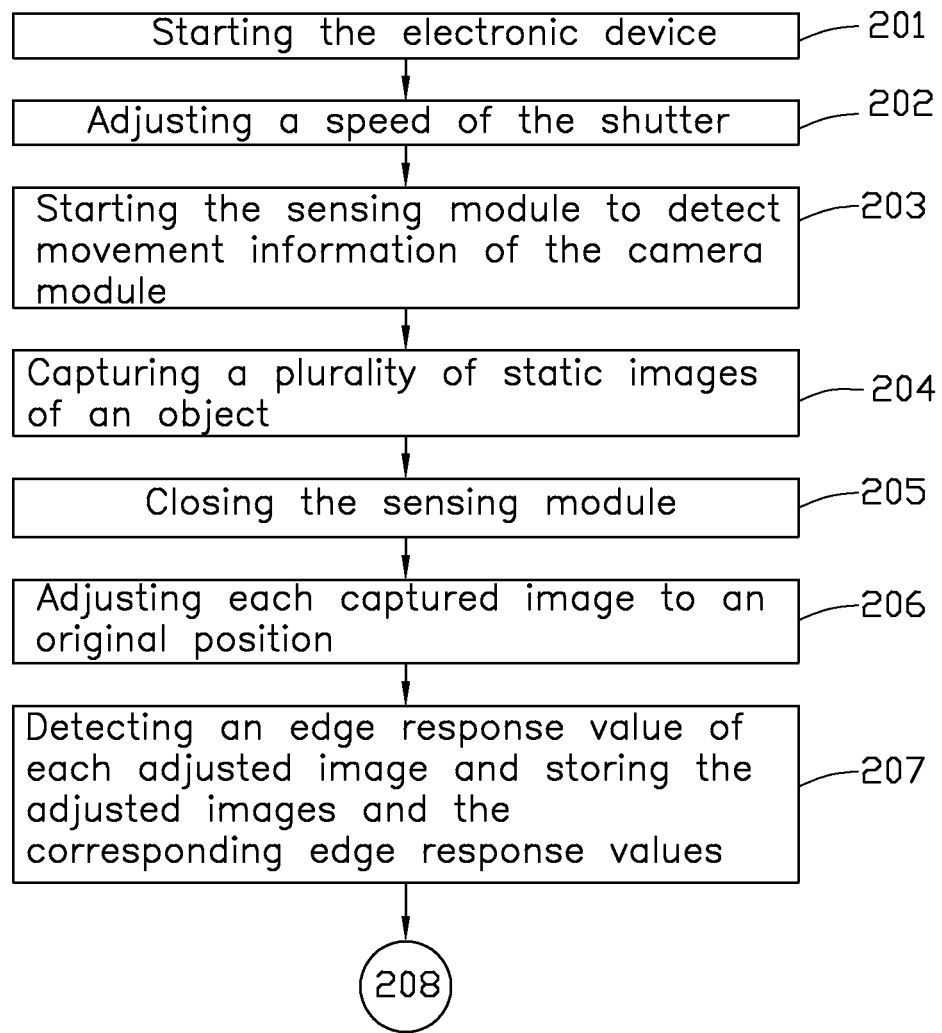
FIGS. 2-3 show a flowchart of an embodiment of an image adjusting method.
Figure 3:
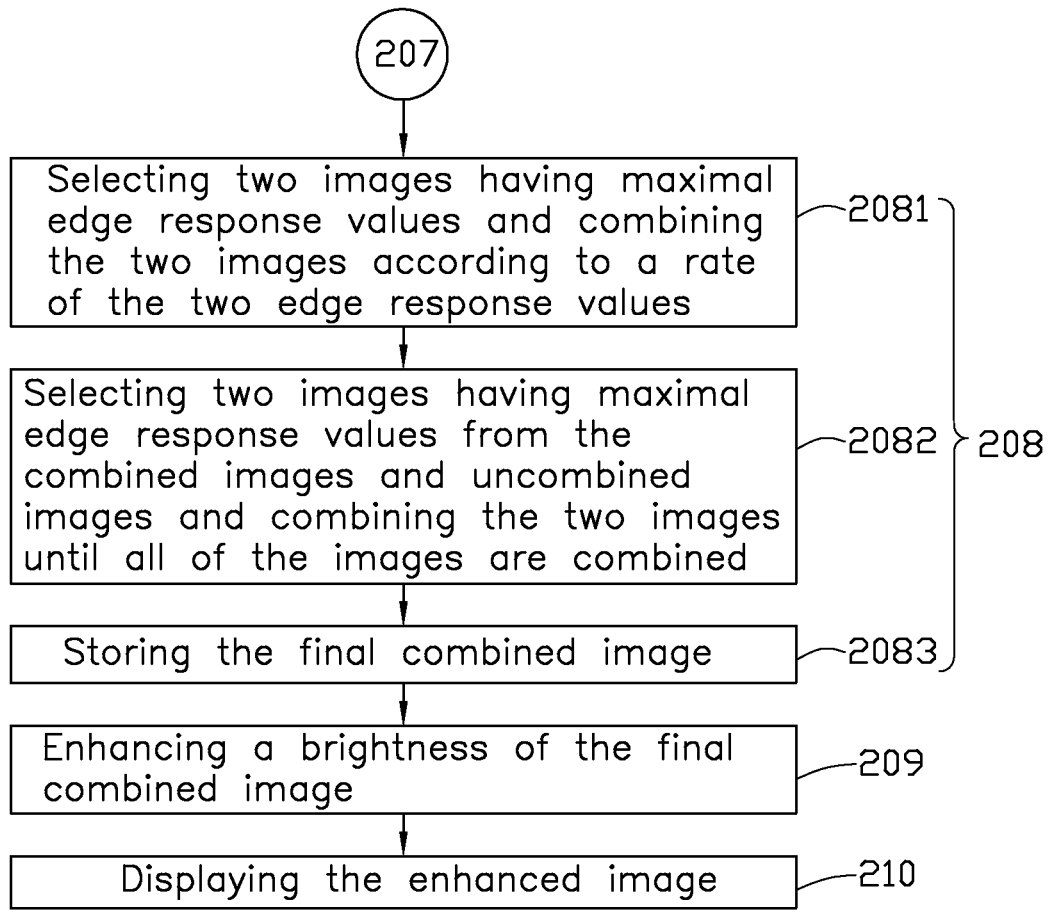

FIGS. 2-3 show an exemplary embodiment of an image adjustment method. The method can include the following steps.

In 201, the electronic device is started and set to capture images.

In 202, a speed of the shutter of the electronic device is adjusted. For example, the speed of the shutter of the electronic device is increased to improve a definition of the image captured by the camera module.

In 203, the sensing module is started to detect movement information of the camera module, such as a shake of the camera module.

In 204, the camera module captures a plurality of static images of an object (for example, three images).

In 205, the sensing module is closed to save power of the electronic device.

In 206, the image adjusting unit dynamically adjusts each captured image according to the detected movement information from the sensing module, thereby correcting each captured image to an original position.

In 207, the detecting unit detects an edge response value of each adjusted image, and stores the adjusted images and the corresponding edge response values to the storing module.

In 208, the image combining unit selects and combines the adjusted images in turn according to the edge response values detected by the detecting unit, thereby obtaining a clear and stable image. At least the following sub-steps can be included in 208.

In 2081, the image combining unit selects two images having maximal edge response values (that is, the clearest images) and combines the two images having maximal edge response values according to a rate of the two edge response values. In one embodiment, if an edge response value of a first image is a, and an edge response value of a second image is b, then a rate of the first image in the combined image is $$\frac{a}{a+b}*100\%,$$

and a rate of the second image in the combined image is $$\frac{b}{a+b}*100\%.$$

For example, if the edge response value of the first image is 6, and the edge response value of the second image is 4, then the rate of the first image in the combined image is 60%, the rate of the second image in the combined image is 40%. In detail, the image combining unit multiplies pixel values of the first image by 0.6, multiplies pixel values of the second image by 0.4, and combines the first image and the second image together. Thus, the image combining unit distributes a rate of the two images according to the edge response values, thereby combining the two images into a clear image.

In 2082, the detecting unit detects an edge response value of the combined image. The combined image and the edge response value of the combined image are also stored in the storing module. Then, the image combining unit continues to select two images having maximal edge response values from the combined images and uncombined images, and combines the two images according to the above manner until all of the images are combined.

In 2083, after all the images are combined, the image combining unit transmits the final combined image to the storing module.

In 209, the brightness adjusting unit receives image data of the final combined image from the storing module, enhances a brightness of the final combined image, and transmits the enhanced image to the storing module.

In 210, the displaying module displays the enhanced image stored in the storing module.

In summary, the electronic device 100 includes the image combining unit 155 for combining the images captured by the camera module 11 by the Sobel edge detecting technology, thereby obtaining a clear and stable image. A structure of the electronic device 100 is simplified, and the electronic device 100 does not need to be configured with additional mechanisms or elements. Thus, a cost of the electronic device 100 can be effectively reduced. In addition, the electronic device 100 includes the image adjusting unit 151 for dynamically adjusting the images captured by the image module 11, thus reducing a processing time of the electronic device 100.

In the present specification and claims, the word "a" or "an" preceding an element does not exclude the presence of a plurality of such elements. Further, the word "comprising" does not exclude the presence of elements or steps other than those listed.

It is to be also understood that even though numerous characteristics and advantages of exemplary embodiments have been set forth in the foregoing description, together with details of the structures and functions of the embodiments, the disclosure is illustrative only, and changes may be made in detail, especially in the matters of arrangement of parts within the principles of this disclosure to the full extent indicated by the broad general meaning of the terms in which the appended claims are expressed.

What is claimed is:

1. An electronic device, comprising:
   a camera module that captures a plurality of images of an object;
   a processor: and
   a storing module storing one or more programs, which when executed by the processor, cause the processor to:
   select two images having maximal edge response values and combine the two images having maximal edge response values according to a rate of the two edge response values;
   detect an edge response value of a combined image;
   store the combined image and the edge response value of the combined image;
   select two images having maximal edge response values from the combined images and uncombined images, and combine the two images until all of the images are combined.

2. The electronic device of claim 1, further comprising a sensing module, wherein the sensing module detects movement information of the camera module, the one or more programs further cause the processor to correct the captured images by the camera module to an original position before detecting the edge response value of each image, according to the detected movement information.

3. The electronic device of claim 1, further comprising a shutter, wherein a definition of the image is enhanced through adjusting a speed of the shutter.

4. The electronic device of claim 3, wherein when the speed of the shutter is increased, the one or more programs further cause the processor to enhance a brightness of a final combined image.

5. An image adjusting method applied to an electronic device, comprising:
   a. starting the electronic device;
   b. capturing a plurality of static images of an object;
   c. detecting an edge response value of each image;
   d. selecting and combining two images having maximum edge response values in turn according to a rate of the edge response values;
   wherein the step d further comprises at least the following sub-steps:
   selecting two images having maximal edge response values and combining the two images having maximal edge response values according to a rate of the two edge response values;
   detecting an edge response value of a combined image;
   storing the combined image and the edge response value of the combined image;
   selecting two images having maximal edge response values from the combined images and uncombined images, and combining the two images until all of the images are combined.

6. The image adjusting method of claim 5, further comprising the following steps before the step c:
   detecting movement information of a camera module of the electronic device;
   dynamically adjusting each image according to the detected movement information to correct each captured image to an original position.

7. The image adjusting method of claim 5, further comprising a step of adjusting a speed of a shutter of the electronic device before the step b.

8. The image adjusting method of claim 5, further comprising a step of enhancing a brightness of a final combined image.

* * * * *